US010121175B2

(12) United States Patent
Zhang (10) Patent No.: US 10,121,175 B2
(45) Date of Patent: *Nov. 6, 2018

(54) INSTANT MESSAGING ROBOT TO PROVIDE PRODUCT INFORMATION

(71) Applicant: eBay Inc., San Jose, CA (US)

(72) Inventor: Xiaoming Zhang, Pudong (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,508

(22) Filed: Aug. 30, 2017

(65) Prior Publication Data

US 2017/0364979 A1    Dec. 21, 2017

Related U.S. Application Data

(63) Continuation of application No. 15/174,466, filed on Jun. 6, 2016, now Pat. No. 9,779,437, which is a (Continued)

(51) Int. Cl.
*G06F 15/16* (2006.01)
*G06Q 30/06* (2012.01)
(Continued)

(52) U.S. Cl.
CPC ... *G06Q 30/0613* (2013.01); *G06F 17/30569* (2013.01); *G06Q 30/0269* (2013.01);
(Continued)

(58) Field of Classification Search
CPC .......... G06F 17/30569; G06Q 30/0611; G06Q 30/0613; H04L 51/02; H04L 51/04
See application file for complete search history.

(56) References Cited

U.S. PATENT DOCUMENTS 7,200,413 B2    4/2007 Montemer et al.
7,707,218 B2    4/2010 Gocht et al.
(Continued)

FOREIGN PATENT DOCUMENTS

CN    1379886 A    11/2002
CN    101017489 A    8/2007
(Continued)

OTHER PUBLICATIONS

International Search Report received for PCT Application No. PCT/CN2010/001117, dated Apr. 28, 2011, 3 pages.
(Continued)

*Primary Examiner* — Mohamed A Wasel
(74) *Attorney, Agent, or Firm* — Schwegman Lundberg & Woessner, P.A.

(57) ABSTRACT

In one example, a data collection module collects product data over a network, identifies that the product data is related to a particular product, and stores the product data and an association between the product data and the particular product in a database. An instant messaging engine receives a request for the product data after the product data is stored in the database and an interpreter module identifies, in response to the request, the request to correspond to the particular product and retrieve the product data based on the association between the particular product and the product data. The instant messaging engine transmits, using an instant messaging protocol, a response to the request, the response including the product data.

17 Claims, 9 Drawing Sheets

Related U.S. Application Data continuation of application No. 14/684,170, filed on Apr. 10, 2015, now Pat. No. 9,384,506, which is a continuation of application No. 13/865,768, filed on Apr. 18, 2013, now Pat. No. 9,043,422, which is a continuation of application No. 13/505,362, filed as application No. PCT/CN2010/001117 on Jul. 23, 2010, now Pat. No. 8,447,823.

(51) Int. Cl.
*G06Q 30/02* (2012.01)
*H04L 12/58* (2006.01)
*G06F 17/30* (2006.01)
*H04L 29/08* (2006.01)

(52) U.S. Cl.
CPC ..... *G06Q 30/0611* (2013.01); *G06Q 30/0625* (2013.01); *H04L 51/02* (2013.01); *H04L 51/04* (2013.01); *H04L 67/10* (2013.01)

(56) References Cited

U.S. PATENT DOCUMENTS

| | | | |
|---|---|---|---|
| 7,756,750 B2* | 7/2010 | Venkiteswaran .. | G06Q 30/0613 705/26.41 |
| 8,447,823 B2 | 5/2013 | Zhang | |
| 9,043,422 B2 | 5/2015 | Zhang | |
| 9,384,506 B2 | 7/2016 | Zhang | |
| 9,779,437 B2 | 10/2017 | Zhang | |
| 2003/0217052 A1* | 11/2003 | Rubenczyk ....... | G06F 17/30643 |
| 2004/0019499 A1* | 1/2004 | Murashita ......... | G06F 17/30864 705/1.1 |
| 2007/0136301 A1* | 6/2007 | Jardin ................ | H04L 41/0806 |
| 2007/0213052 A1* | 9/2007 | Lim .................. | H04L 29/06027 455/435.1 |
| 2007/0239564 A1* | 10/2007 | Wirth, Jr. ............. | G06Q 30/06 705/26.8 |
| 2008/0147514 A1 | 6/2008 | Shuster et al. | |
| 2009/0248537 A1* | 10/2009 | Sarkeshik ............ | G06Q 30/02 705/26.1 |
| 2010/0004980 A1 | 1/2010 | Bowen | |
| 2010/0186004 A1 | 7/2010 | Will et al. | |
| 2011/0082735 A1 | 4/2011 | Kannan et al. | |
| 2011/0153312 A1* | 6/2011 | Roberts ............. | G06F 17/30654 704/9 |
| 2012/0215871 A1 | 8/2012 | Zhang | |
| 2013/0238732 A1 | 9/2013 | Zhang | |
| 2015/0213538 A1 | 7/2015 | Zhang | |
| 2016/0283997 A1 | 9/2016 | Zhang | |
| 2017/0024786 A1* | 1/2017 | DuBose ............. | G06Q 30/0603 |
| 2017/0352041 A1* | 12/2017 | Ramamurthy ...... | G06F 3/04847 |

FOREIGN PATENT DOCUMENTS

| | | |
|---|---|---|
| CN | 101151607 A | 3/2008 |
| CN | 101193069 A | 6/2008 |
| WO | 2012/009832 A1 | 1/2012 |

OTHER PUBLICATIONS

Written Opinion received for PCT Application No. PCT/CN2010/001117, dated Apr. 28, 2011, 7 pages.
Notice of Allowance received for U.S. Appl. No. 13/505,362, dated Jan. 24, 2013, 12 pages.
Corrected Notice of Allowance received for U.S. Appl. No. 13/505,362, dated Mar. 21, 2013, 4 pages.
Non Final Office Action received for U.S. Appl. No. 13/865,768, dated Sep. 8, 2014, 9 pages.
Response to Non-Final Office Action filed Dec. 8, 2014, for U.S. Appl. No. 13/865,768, dated Sep. 8, 2014, 12 pages.
Notice of Allowance received for U.S. Appl. No. 13/865,768, dated Jan. 27, 2015, 7 pages.
Preliminary Amendment for U.S. Appl. No. 14/684,170, filed Apr. 23, 2015, 7 pages.
Preliminary Amendment for U.S. Appl. No. 13/865,768, filed Oct. 14, 2013, 8 pages.
Pre-Interview First Office Action received for U.S. Appl. No. 14/684,170, dated Jul. 15, 2015, 4 pages.
Office Action received for Chinese Patent Application No. 201080068211.9, dated Jul. 17, 2015, 6 pages (Including English Translation).
Pre-Interview First Office Action received for U.S. Appl. No. 14/684,170, dated Nov. 6, 2015, 5 pages.
Response to Office Action filed on Dec. 1, 2015, for Chinese Patent Application No. 201080068211.9, dated Jul. 17, 2015, 12 pages (Including English Translation of Claims).
Response to Non-Final Office Action filed on Jan. 6, 2016, for U.S. Appl. No. 14/684,170, dated Nov. 6, 2015, 10 pages.
Notice of Allowance received for U.S. Appl. No. 14/684,170, dated Mar. 9, 2016, 7 pages.
Office Action received for Chinese patent Application No. 201080068211.9, dated Mar. 30, 2016, 4 pages.
Response to Office Action filed on Jun. 14, 2016, for Chinese Patent Application No. 201080068211.9, dated Mar. 30, 2016, 5 pages. (Including English Translation of Claims).
Preliminary Amendment for U.S. Appl. No. 15/174,466, filed Jul. 6, 2016, 7 pages.
Office Action received for Chinese Patent Application No. 201080068211.9, dated Jul. 12, 2016, 4 pages (Only Office Copy).
Response to Office Action filed on Oct. 27, 2016, for Chinese Patent Application No. 201080068211.9, dated Jul. 12, 2016, 18 pages (Including English Translation of Claims).
Non-Final Office Action received for U.S. Appl. No. 15/174,466, dated Feb. 10, 2017, 7 pages.
Notice of Reexamination received for Chinese Patent Application No. 201080068211.9, dated Mar. 27, 2017, 10 pages (Including English Translation).
Response to Non-final Office Action filed on May 10, 2017 for U.S. Appl. No. 15/174,466, dated Feb. 10, 2017, 7 pages.
Response to Notice of Reexamination filed on May 11, 2017 for Chinese Patent Application No. 201080068211.9, dated Mar. 27, 2017, 17 pages (Including English Translation of Claims).
Notice of Allowance received for U.S. Appl. No. 15/174,466, dated Jun. 1, 2017, 9 pages.
Response to Notice of Reexamination filed on Oct. 23, 2017 for Chinese Patent Application No. 201080068211.9, dated Sep. 7, 2017, 7 pages.

* cited by examiner

INSTANT MESSAGING ROBOT TO PROVIDE PRODUCT INFORMATION

RELATED APPLICATIONS

This application is a continuation of U.S. patent application Ser. No. 15/174,466, filed Jun. 6, 2016, which is a continuation of U.S. patent application Ser. No. 14/684,170, filed on Apr. 10, 2015, which application is a continuation of U.S. patent application Ser. No. 13/865,768, filed on Apr. 18, 2013, now U.S. Pat. No. 9,043,422, which application is a continuation of U.S. patent application Ser. No. 13/505,362, filed on May 1, 2012, now U.S. Pat. No. 8,447,823, which application is a U.S. National Stage Filing under 35 U.S.C. 371 from international Application No. PCT/CN2010/001117, filed on Jul. 23, 2010, which applications are incorporated herein by reference in their entireties.

TECHNICAL FIELD

The present application relates generally to the technical field of use of communication over a network such as the Internet. More specifically, the present application relates to automatically responding, over the network, to a request for information.

BACKGROUND

Advancements in computer and networking technologies have enabled persons to find information about products and services or conduct commercial and financial transactions "on-line" via computer-based applications. A number of entities have established their presence on the Internet by operating websites that provide information on products and services, reviews of products or services, or facilitate acquisition of product or services.

A common goal for many enterprises is to attract customers to their websites or advertise their products and services. For example, some enterprises advertise on other websites, on television, on the radio, or print media. Some enterprises also attempt to reach customers by mailing or mailing advertisements or coupons to customers directly.

Advancements in computer and networking technologies have also enabled people to communicate "instantly" or in near-real-time through the use of instant messaging (IM) protocols, short messaging service (SMS) protocols, multiple messaging service (MMS) protocols, or instant messaging applications embedded in web browsers.

Despite the many technical advances, a great number of technical challenges and problems remain. One such problem involves determining other ways to attract customers to a website and give customers a better user experience. Another such problem involves interacting with a customer to determine their interests in an efficient manner and delivering content that fits the customer's interests.

BRIEF DESCRIPTION OF THE DRAWINGS

Some embodiments are illustrated by way of example and not limitation in the figures of the accompanying drawings in which.

DETAILED DESCRIPTION

Example methods and systems to automatically respond to a request for product information or transaction information are described. In the following description, for purposes of explanation, numerous specific details are set forth in order to provide a thorough understanding of example embodiments. It will be evident, however, to one skilled in the art that the present invention may be practiced without these specific details.

An instant messaging (IM) robot is a system designed to interact with a user of an instant messaging client, often over a network. In some embodiments, IM robots are designed to simulate human interactions by using natural language processing systems to converting human language into something understandable to a machine (e.g., a computer) and converting information from a computer into natural language (e.g., human language). The IM robot may be configured to be compatible with one or more instant messaging protocols as well as other visually based messaging protocols such as short messaging service (SMS) protocols, multiple messaging service (MMS) protocols, or instant messaging applications embedded in web browsers.

In some embodiments the IM robot system may include various components that gather information about a product or transaction from various sources. For example, the IM robot system may "crawl" one or more websites and extract various product information associated with items or services. The IM robot may also be configured to access and examine instant message communications in order to monitor various data or search various databases or contact various servers to request product information or transaction data. A product, in this context, may be anything that may be the subject of a transaction. For example, a product may include any item or service that is able to be sold, leased, rented, etc. Products may include housing units for rent, tickets to events, menu items at restaurants, collectibles, etc. Products may also include services such as plumbing, medical or legal services, etc.

The IM robot system may use this information to provide a user of an instant messaging client suggestions and information about one or more products. The information and suggestions may be targeted toward the particular user based on a user's interests or characteristics that are discovered through a dialog between the user and the IM robot. For example, when a user sends, via an instant messaging protocol, a message requesting product information to the IM robot, the IM robot may attempt to determine or narrow down suggestions or product information to those that match a user's interests. This may involve prompting the user for additional information or search criteria. At some point, the IM robot may perform a search and identify one or more products that are compatible with a user's interests. Then the IM robot may respond to the user with information about the product. For example, the IM robot may supply the user with details about the product, product ratings, comments from users or owners of the product, a popularity level of a product, a link to more information about the product, a link to purchase the product, etc. In this way, certain embodiments of the IM robot may provide a benefit to the user by providing suggestions or product information targeted to the particular user. Certain embodiments of the IM robot may also provide a benefit to one or more websites by directing users interested in a particular product to the product site where the users may make a purchase.

In some embodiments where a user makes a purchase on a website associated with the IM robot, the IM robot may send a notification messages to the user via the user's instant messaging client. For example, the IM robot may send a notification message to the user to inform them that the user's payment has posted or that the item has shipped. In one embodiment, a user may request the status of one or more transactions from the IM robot and the IM robot may retrieve the statuses of the one or more transactions and communicate them to the user via the instant messaging protocol. In this way, the user may receive notifications and status updates without having to check their email account or login to the website.

Figure 1:
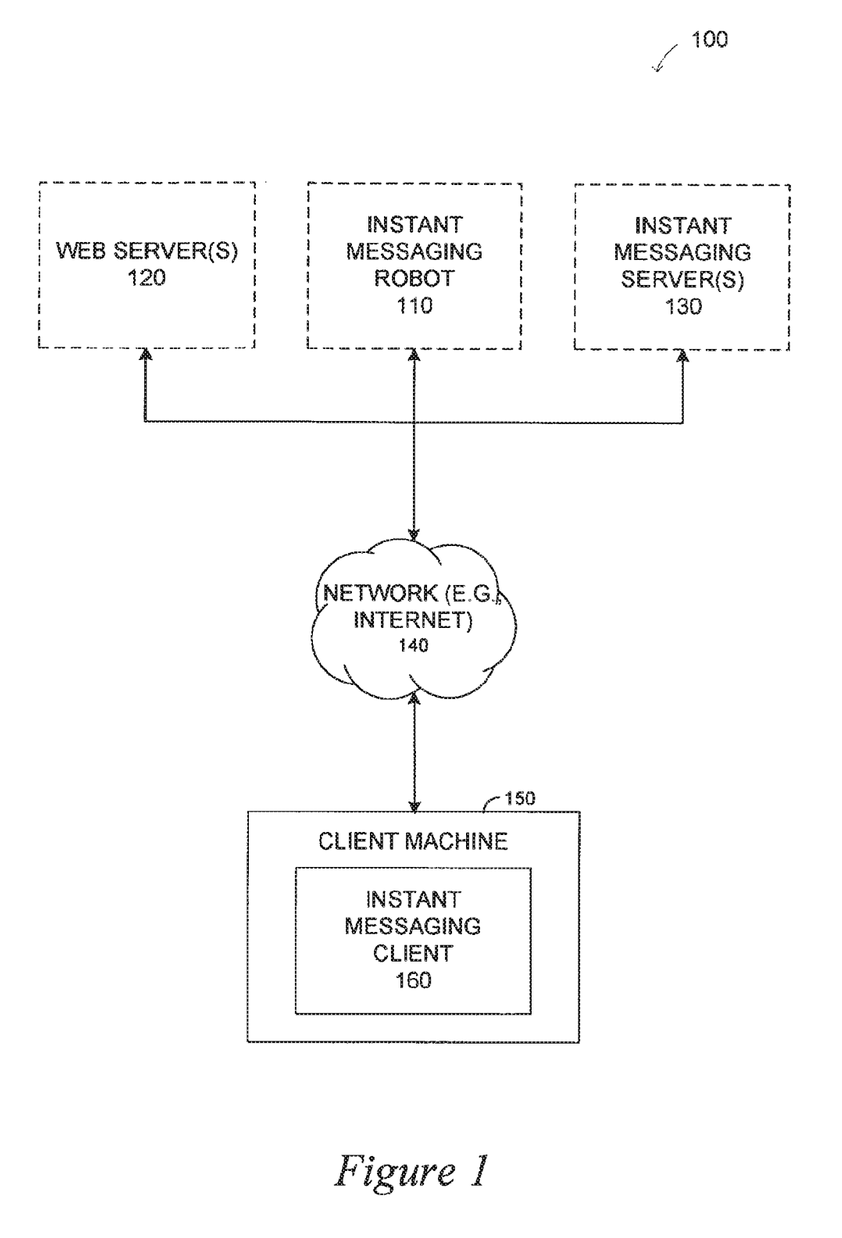
FIG. 1 is a block diagram illustrating a network environment within which an instant messaging (IM) robot may be implemented in accordance with one example embodiment.

FIG. 1 is a block diagram illustrating a network environment within which an instant messaging (IM) robot may be implemented in accordance with one example embodiment. The network environment 100 may include an IM robot 110, one or more web servers 120, an instant messaging server 130, and one or more client machines 150 connected via a network 140 (e.g., the Internet). In one embodiment, the IM robot 110, the web servers 120, and the instant messaging server 130 may all be at the same location or machine. In other embodiments, however, they may all be on separate machines and connected via the network 140. The web servers 120 may host one or more websites, such as an e-commerce website, a review website that posts reviews and ratings on products, a discussion forum website, or any other website that contains product information. Web servers 120 may also host data sources such as a database containing product information.

The instant messaging server 130 may enable an instant messaging client 160 on the client machine 150 to communicate with other instant messaging clients or the IM robot 110. In other embodiments, however, instant messaging clients may be implemented using peer-to-peer technologies and the instant messaging server may not be needed.

As described in greater detail below, the IM robot 110 is configured to collect product data from various sources and communicate with an instant messaging client 160 on a client machine 150. For example, the IM robot 110 may gather product data from the one or more web servers 120 or from a separate database. The IM robot 110 may also engage in a dialog with a user of the instant messaging client 160 and, depending on the dialog, communicate certain information to the instant messaging client 160. The information communicated may include product information or transaction notifications. Further details and components of the IM robot will be explored below with respect to FIG. 2.

Figure 2:
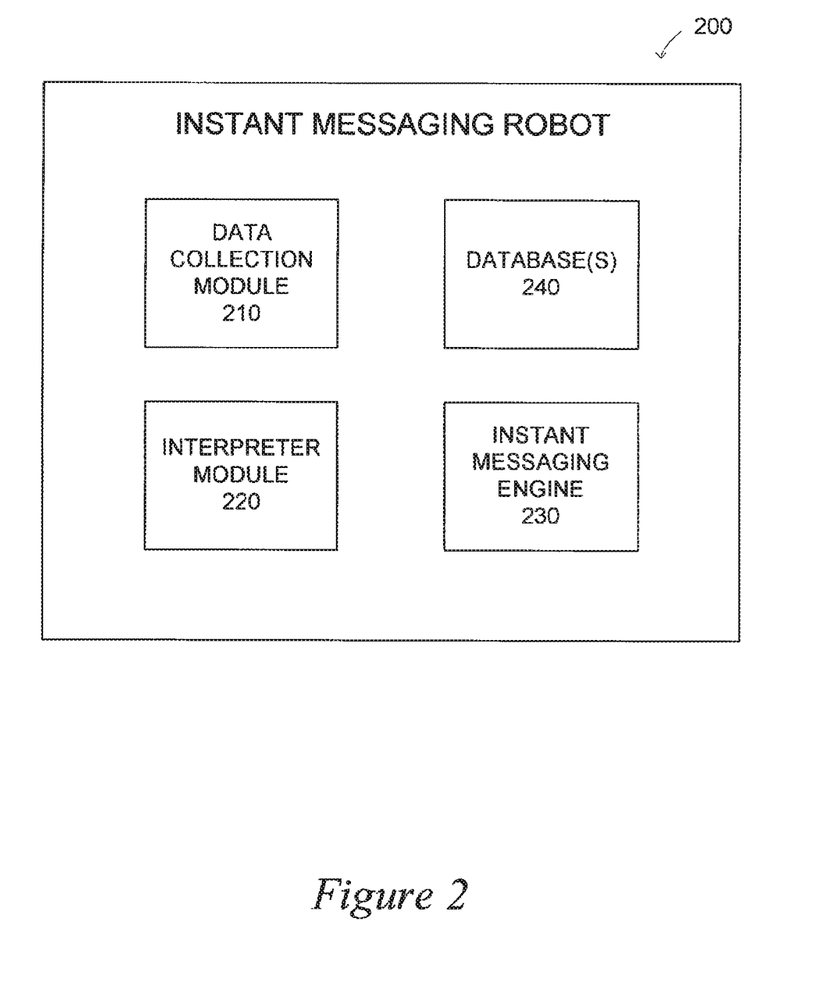
FIG. 2 is a block diagram illustrating an IM robot in accordance with one example embodiment.

FIG. 2 is a block diagram illustrating an IM robot in accordance with one example embodiment. As illustrated in FIG. 2, IM robot 200 may comprise a data collection module 210, an interpreter module 220, an instant messaging engine 230, and one or more databases 240. As described more completely below, each module may be comprised of software instructions, computer hardware components, or a combination of both. To avoid obscuring the invention in unnecessary detail, only a few of the functions are described herein.

The data collection module 210 may be configured to collect various product data over a network. For example, the data collection module 210 may use a web-crawling component to access various websites on the internet and extract product data associated with various products. The data collection module 210 may access the website of a product manufacturer or retailer to extract product details or pricing information or may access review websites or retailer websites that contain product reviews or ratings to extract product reviews and ratings. Social networking websites where users may comment on products, share their comments about products, and discuss products with other members of their social network may also be accessed to extract product information. Other websites such as news media websites may be crawled as well in order to determine how often one or more products are mentioned. The data collection module 210 may also access various databases or other information sources to extract product information or monitor communications received by the IM robot.

After collecting the product data, the data collection module 210 may determine that the product data is related to a particular product. In one embodiment, the data collection module 210 may do this by recognizing that the product data is about the particular product. For example, when a webpage is being crawled or a database is being accessed, the data collection module 210 may identify a product name, product identifier, a manufacturer name, a model number, etc. that identifies the product that the product data on that webpage is about.

All this data may be analyzed to synthesize additional product data about a product. For example, the number and nature of the product reviews, the product ratings, the date the reviews and ratings were submitted, the number of mentions in various websites over a certain period of time, or the number of instant message communications about a product received by the IM robot over a certain period of time may be used to generate a popularity score for a product. The data collection module 210 may also store the collected and synthesized product data collected and an association between the product data and the particular product the product data is about in, for example, a database 240.

The instant messaging engine 230 may be configured to interact with an instant messaging client 160 of FIG. 1 either via an instant messaging server 130 or directly. The instant messaging engine 230 may support one or more communication protocols including one or more instant messaging protocols. For example, the instant messaging engine may determine which communication protocol a messaging client is using and configure further communications with the messaging client to conform to that communication protocol. In this way, an instant messaging engine 230 may send and receive communications from one instant messaging client 160 using one instant messaging protocol and send and receive communications from another instant messaging client 160 using a different instant messaging protocol.

The interpreter module 220 may be configured to interpret communications from a user of an instant messaging client 160 and generate responses to the communications. In some embodiments, a natural language processor may be used to convert natural language (e.g., human language) received from the user of the instant messaging client 160 into a more formal representation that may be better understood by a machine. The natural language processor may also convert machine data, for example, information from a database, into a natural language more easily read or understood by a user.

As will be discussed further below, the interpreter module 220 may engage in a conversation with a user of the instant messaging client 160, determine that a received communication is a request for product data, identify that the request corresponds with one or more products, retrieve the product data for the one or more products, and generate a response to be transmitted to the instant messaging client 160 that includes the product data.

Figure 3:
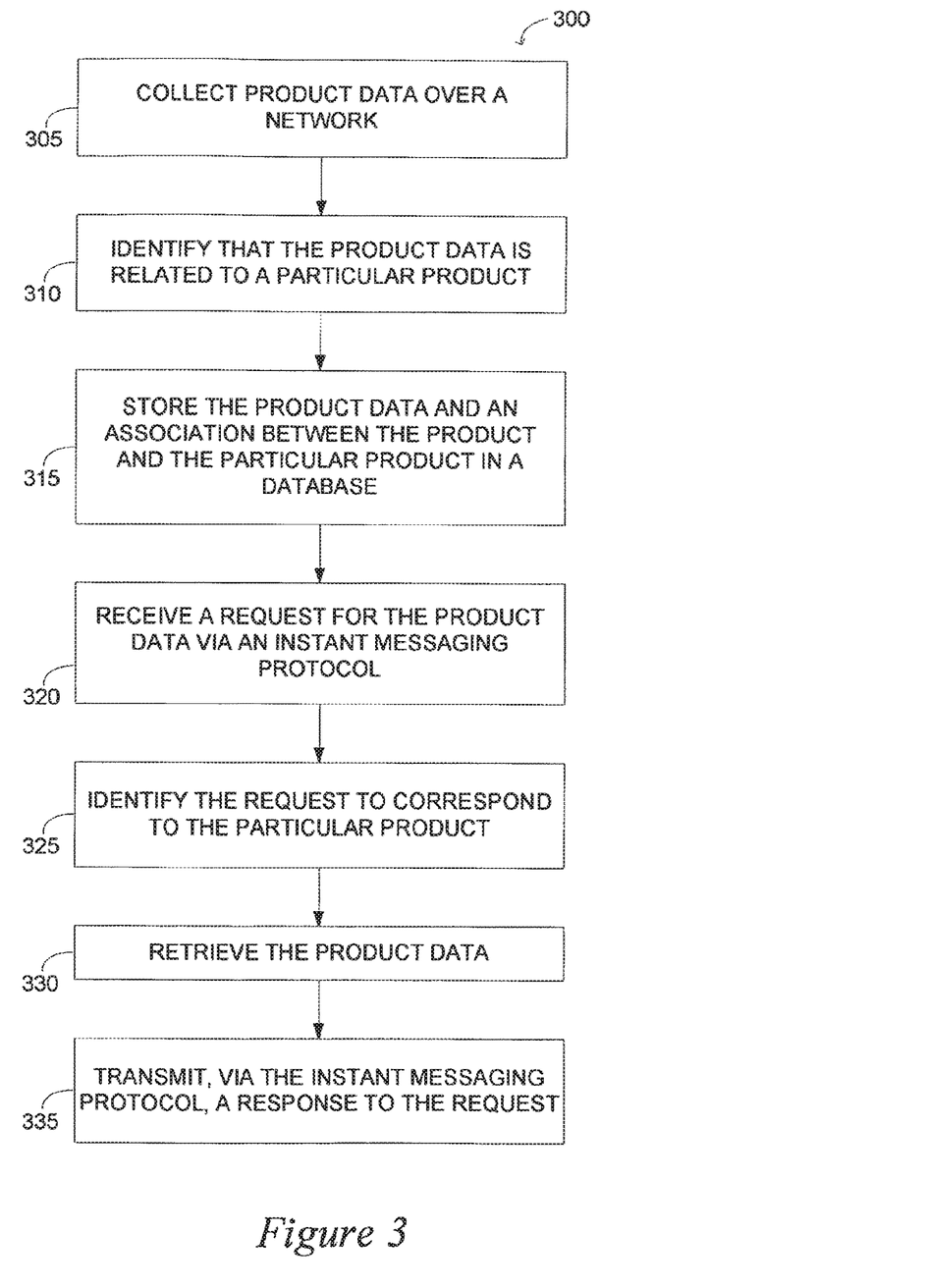
FIG. 3 is a flow diagram illustrating a method to automatically respond to a user, according to various embodiments.

FIG. 3 is a flow diagram illustrating a method to automatically respond to a user, according to various embodiments. One or more of the operations of this or other methods disclosed herein may be performed using one or more processors. The method 300 begins at operation 305, when the data collection module 210 of FIG. 2 collects product data over a network. As mentioned above, in various embodiments, this may involve crawling various websites, accessing one or more databases containing product information, and monitoring IM communications to the IM robot. At operation 310, for each piece of collected product data, the data collection module 210 identifies that the piece of product data is related to a particular product. The relationship between the piece of product data and the particular product may be tracked by storing the product data and an association between the product data and the particular product in a database at operation 315. The association between the product data and the particular product may be stored in several ways depending on which data record and database structures are used. For example, product data may be stored in a product data record that includes a product identifier indicating the particular product associated with the product data. Alternatively, product data may be stored in a product record of the particular product associated with the product data.

At operation 320, the instant messaging engine 230 of the IM robot 200 both of FIG. 2 receives a request for product data via an instant messaging protocol. The request for product data may be for product data associated with a specific product or product data in general. At operation 325, the interpreter module 220 of FIG. 2 identifies that the request corresponds to one or more particular products. In some embodiments, the identification of the particular products is based on the popularity score of a product. For example, if a request from a user does not identify a specific product, (e.g., "What are some good cameras?") the interpreter module 220 may identify one or more products (in this case camera models) based on the product's popularity scores (e.g., the 3 camera models with the highest popularity scores).

After one or more products are identified, the interpreter module 220 then retrieves the product data based on the association between the particular product and the product data at operation 330 and generates a response to the request that includes the product data. At operation 335, the instant messaging engine 230 transmits the response to the sender of the request via the same instant messaging protocol.

Figure 4:
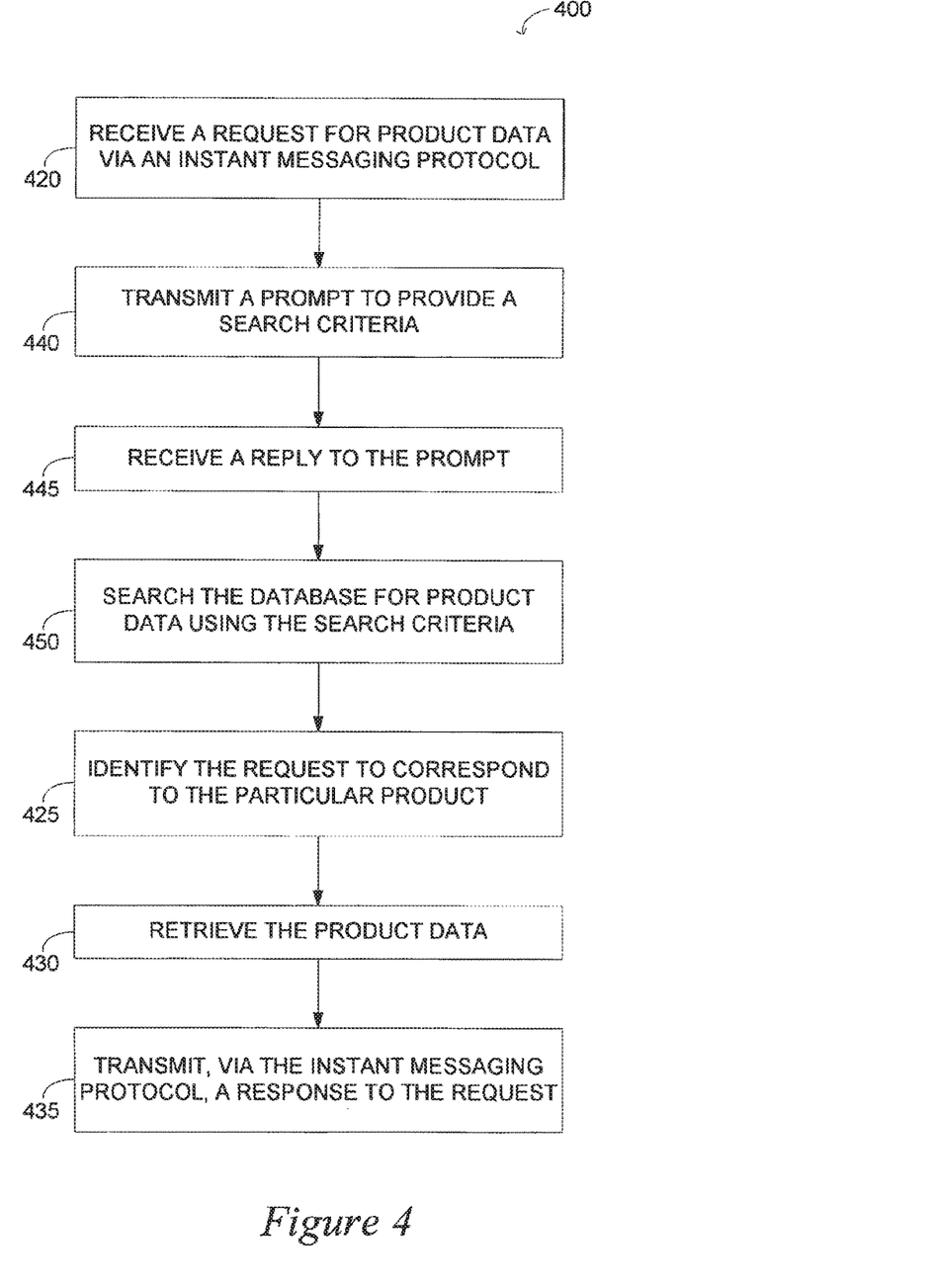
FIG. 4 is a flow diagram illustrating a method to automatically respond to a user, the method including prompting a user for search criteria, according to various embodiments.

On occasion, a user may express their interests broadly in a request for product data. These requests for product data may be too general to identify one or more particular products or if products may be identified, the resulting responses may present too much information to the user. For example, a user of an instant messaging client 160 of FIG. 1 may ask the IM robot "What are some good cameras?" In some instances, retrieving product data on the top rated or most popular cameras may not be helpful to the user. As a result, in some embodiments, the IM robot may be configured to narrow down a user's request for product data by adding additional criteria. FIG. 4 is a flow diagram that illustrates these embodiments.

FIG. 4 is a flow diagram illustrating a method 400 to automatically respond to a user, the method including prompting a user for search criteria, according to various embodiments. At operation 420, the instant messaging engine 230 of FIG. 2 receives a request for product data via an instant messaging protocol. This request may be too general and not reflect a user's true interests. As a result, the interpreter module 220 of FIG. 2 determines that additional search criteria are needed. The interpreter module 220 may generate one or more prompts (e.g., questions) to provide search criteria. The one or more questions or prompts may be transmitted to an instant messaging client 160 of FIG. 1 by the instant messaging engine 230 at operation 440. The user may read the prompt and reply. At operation 445, the instant messaging engine 230 receives the reply to the prompt and converts the reply to search criteria. If additional search criteria are needed, additional prompts may be generated and transmitted in the same manner.

When enough search criteria are obtained, the interpreter module 220 searches a database for product data using the user's request for product data and the additional search criteria (operation 450). Based on the search results, the interpreter module 220 identifies one or more particular products that the request corresponds to (operation 425). The interpreter module 220 then retrieves the product data (operation 430), generates a response to the request that includes the product data, and the instant messaging engine 230 transmits the response to the request to the instant messaging client 160 of the user via the instant messaging protocol (operation 435). An example user interface illustrating the prompts generated by the interpreter module 220 and a user's replies to the prompt is shown with respect to FIG. 5.

Figure 5:
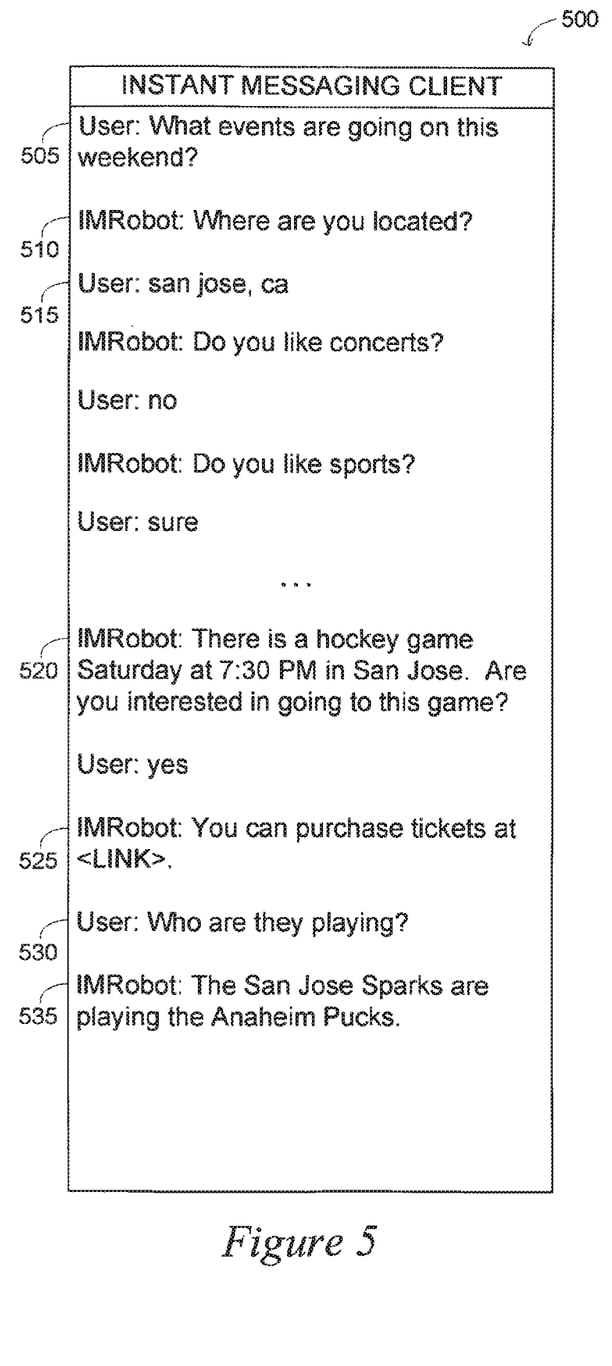
FIG. 5 is a user interface illustrating a dialog between a user and an IM robot, according to various embodiments.

FIG. 5 is a user interface 500 illustrating a dialog between a user and an IM robot, according to various embodiments. As illustrated in FIG. 5, the user interlace 500 is an instant messaging client on a client machine that shows messages of the user (User) and the IM robot (IMRobot). In this fictional scenario, a user requests product data with message 505 ("What events are going on this weekend?"). As discussed above, this request for product data may be too broad and the interpreter module 220 of FIG. 2 may determine that more search criteria are needed. Prompts for the user to provide search criteria may be generated and transmitted to the user's instant messaging client as shown in message 510 ("Where are you located?"). The user may reply to the prompt as shown in message 515 ("san jose, ca").

Additional search criteria may be gathered from the user and at some point, the interpreter module 220 will determine that enough search criteria are obtained and search a database. One or more products may be identified as corresponding to the user's request and product data of the one or more identified products may be retrieved and transmitted to the user as illustrated by message 520 ("There is a hockey game Saturday at 7:30 PM in San Jose."). The interpreter module 220 may further include a message to the user confirming the user's interest in the identified product ("Are you interested in going to this game") and, in response, providing additional product data, for example, at message 525, the IM robot provides a user with a link to purchase tickets to the game.

In some cases a user may request additional details about a product as illustrated in message 530 ("Who are they playing?"). In response to the user's question, the interpreter module 220 may identify the additional product data requested by the user, retrieve it, generate a response that includes the additional product data, and transmit the response to the user's instant messaging client as seen in message 535 ("The San Jose Sparks are playing the Anaheim Pucks.").

Figure 6:
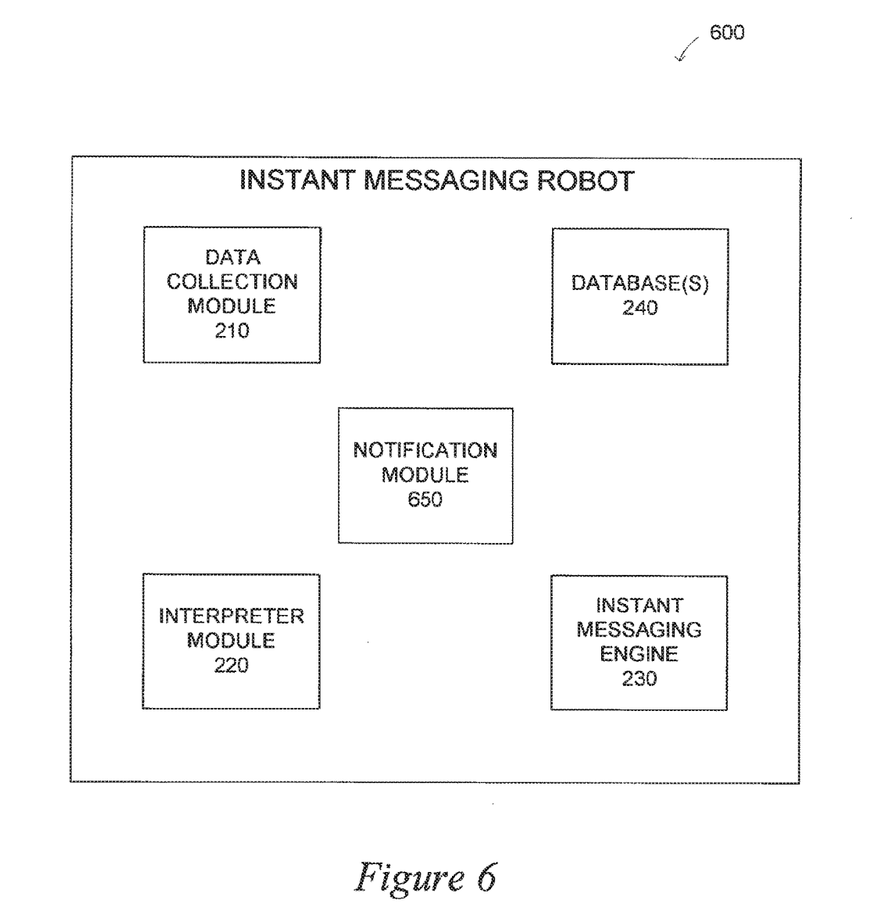
FIG. 6 is a block diagram illustrating an IM robot in accordance with one example embodiment.

If the user selects the link to purchase the product (in this case tickets to the game), a user may be taken to a user interface such as a web page or application interface where the user can make a transaction associated with the product (e.g., purchase the product). During the transaction process, the user may be asked for an instant messaging identifier (e.g., a screen name). If the user provides his instant messaging identifier, it may be stored at a web server 120 of FIG. 1 of an ecommerce website or in another database such as a database 240 associated with the IM robot 200 both of FIG. 2. In various embodiments, the user's instant messaging identifier may later be used by the IM robot 200 to communicate notifications, such as notifications associated with the transaction, to a user. FIG. 6 further illustrates these embodiments.

FIG. 6 is a block diagram illustrating an IM robot 600 in accordance with one example embodiment. Similar to the IM robot 200 shown in FIG. 2, IM robot 600 shown in FIG. 6 may include a data collection module 210, an interpreter module 220, an instant messaging engine 230, and one or more databases 240. In addition to these components, however, IM robot 600 may also include a notification module 650. The notification module 650 may be configured to determine that a notification event has occurred and generate a notification message. The notification message may then be sent by the instant messaging engine 230 to an instant messaging client 160 of FIG. 1 associated with the instant messaging identifier (e.g., a screen name) either directly or via an instant messaging server 130 shown in FIG. 1. In one embodiment, if an instant messaging client 160 associated with the instant messaging identifier is not available (e.g., a user associated with the instant messaging identifier is not signed on), the transmission of the notification message may be delayed by the notification module 650 or the instant messaging server 130 until an instant messaging client 160 associated with the instant messaging identifier is available.

Figure 7:
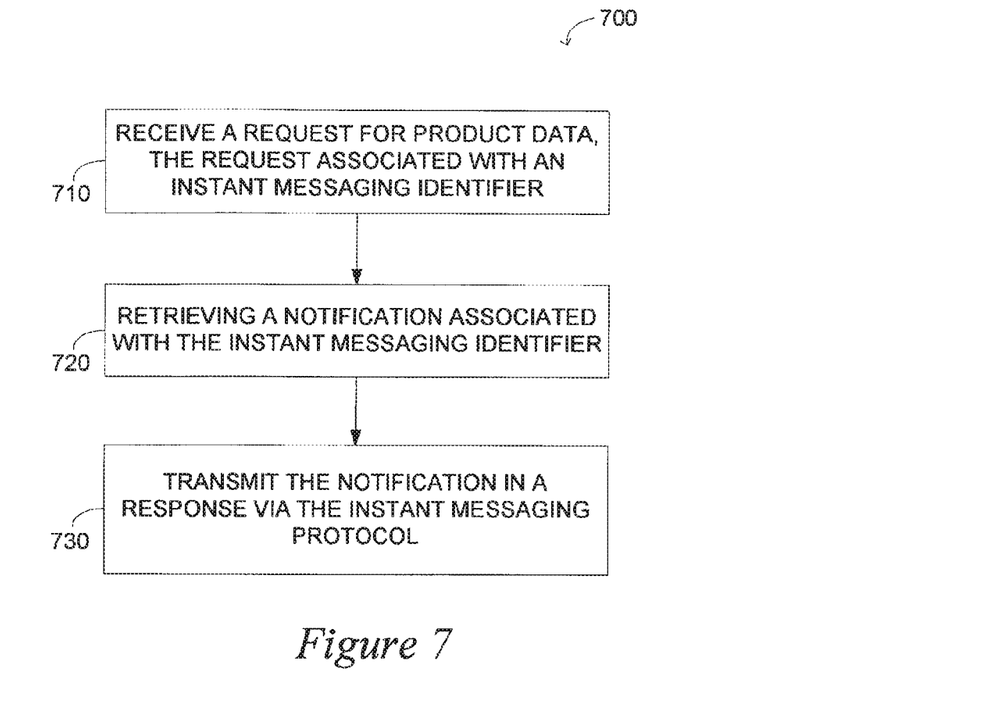
FIG. 7 is a flow diagram illustrating a method to transmit a notification to a user, according to various embodiments.

In some embodiments, the notification messages are generated automatically, in response to a notification event. In other embodiments, however, notification messages may be generated in response to receiving a request front a user using an instant messaging client 160 associated with the instant messaging identifier. FIG. 7 helps to illustrate one such embodiment.

FIG. 7 is a flow diagram illustrating a method 700 to transmit a notification to a user, according to various embodiments. At operation 710, the instant messaging engine 230 of FIG. 6 may receive a request for product data (e.g., a status update regarding a purchase of a product) from an instant messaging client 160 of FIG. 1 associated with the instant messaging identifier. This instant messaging engine 230 may be able to determine that the request is associated with an instant messaging identifier (e.g., the request is associated with the instant messaging identifier of the sender of the request). The notification module 650, at operation 720, may retrieve a notification message associated with the instant messaging identifier that was generated in response to a notification event and, at operation 730, the instant messaging engine 230 may transmit the notification message in a response to the instant messaging client 160 associated with the instant messaging identifier.

In some embodiments, the notification module 650 may be able to identify one or more transactions associated with the instant messaging engine or associated with the instant messaging identifier and a product identified in the request. The example user interfaces of FIGS. 8A and 8B may help illustrate this.

Figure 8A:
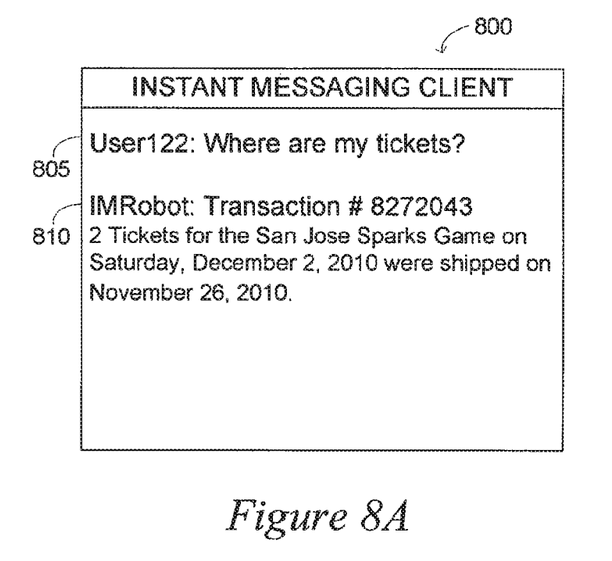
FIG. 8A is a user interface illustrating a dialog between a user and an IM robot, according to various embodiments.
Figure 8B:
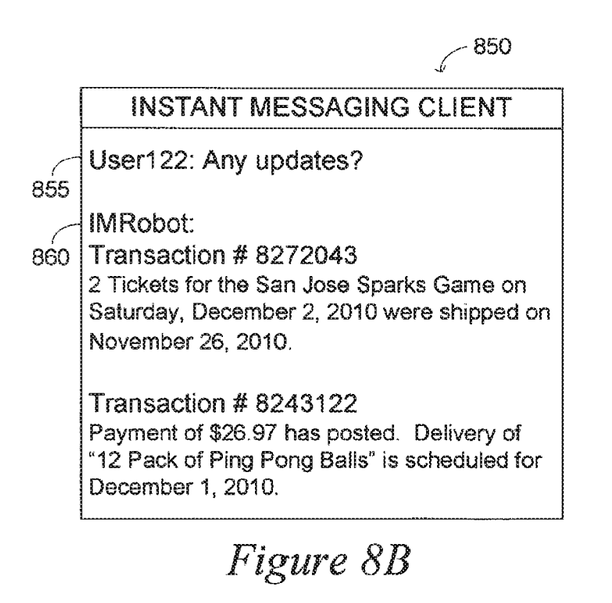
FIG. 8B is a user interface illustrating a dialog between a user and an IM robot, according to various embodiments.

FIG. 8A is a user interface 800 illustrating a dialog between a user and an IM robot, according to various embodiments. As illustrated in FIG. 8A, the user interface 800 is an instant messaging client on a client machine that shows messages of the user (User122) and the IM robot (IMRobot). In this fictional scenario, a user requests status information associated with "tickets" at message 805 ("Where are my tickets?"). The notification module 650 shown in FIG. 6 may identify one or more transaction associated with the user's instant messaging identifier "User122." The notification module 650 may also attempt to determine if there is a product identified in the request. In this case, the notification module 650 may determine that the term "tickets" in the request identifies the 2 tickets for the San Jose Sparks Game on Dec. 2, 2010. The notification module 650 may then retrieve one or more notification messages associated with the instant messaging identifier "User122" and the product "2 tickets for the San Jose Sparks Game on Dec. 2, 2010." The notification module 650 may generate a response message 810 to the user's request and have the response transmitted to the user. FIG. 8B discusses a fictional scenario where the user does not identify a product in the request.

FIG. 8B is a user interface 850 illustrating a dialog between a user and an IM robot, according to various embodiments. In this fictional scenario, a user requests status information but does not identify any product at message 855 ("Any updates?"). In one embodiment, the notification module 650 shown in FIG. 6 may simply retrieve one or more notification messages associated with the instant messaging identifier "User122." In another embodiment, the notification module 650 may identify one or more transaction associated with the user's instant messaging identifier "User122" and retrieve one or more notification messages associated with those one or more transactions. After retrieval of the notification messages, the notification module 650 may generate a response message 860 to the user's request and have the response transmitted to the user.

Figure 9:
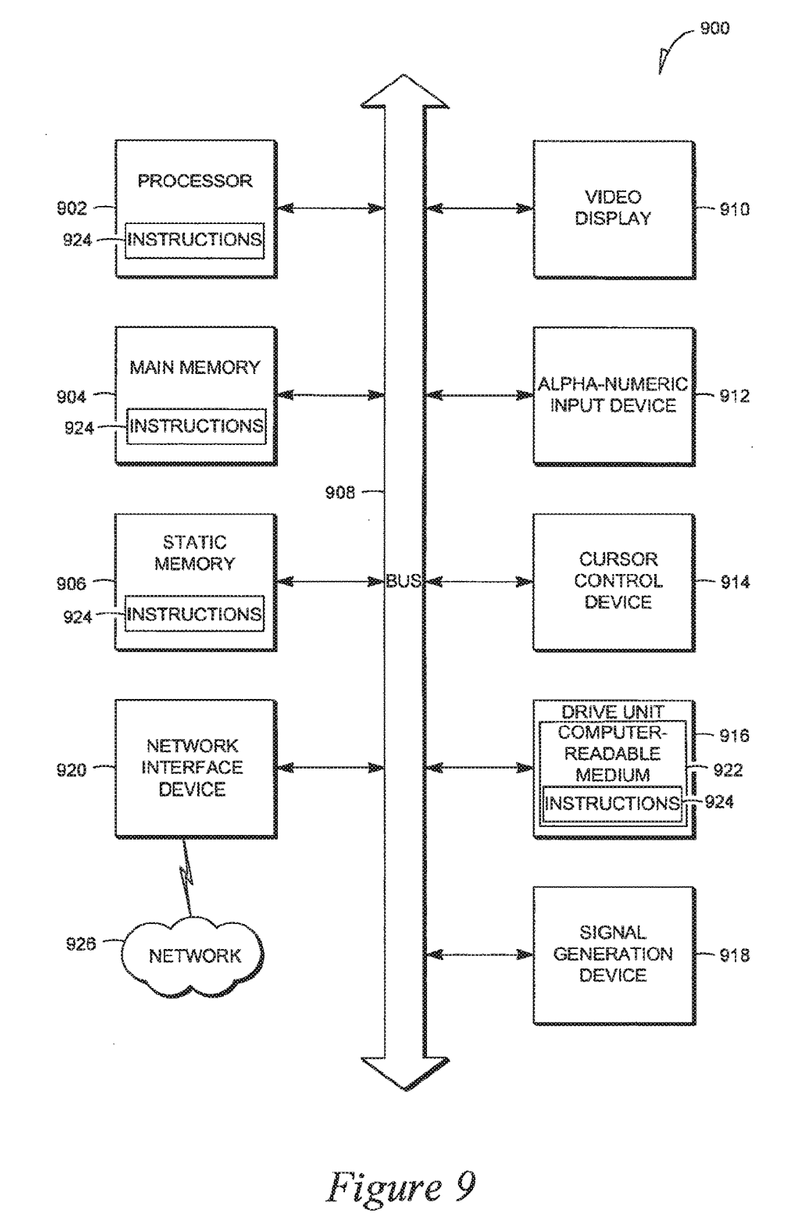
FIG. 9 is a diagrammatic representation of a machine in the example form of a computer system, according to various embodiments.

FIG. 9 is a diagrammatic representation of a machine in the example form of a computer system 900 according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The tem "machine-readable medium" shall also be taken to include any non-transitory medium that is capable of storing, encoding or carrying a set of instructions for execution by the machine and that cause the machine to perform any one or more of the methodologies of the present invention. The term "machine-readable medium" shall accordingly be taken to include, but not be limited to, storage mediums such as solid-state memories, optical media, and magnetic media.

Thus, a method and system for automatically respond to a request for product information or transaction information is described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving a natural language request from a user via a messaging protocol, the natural language request comprising a first request criteria;
   translating the natural language request to a search query based on the first request criteria;
   retrieving a set of search results based on the search query;
   determining that the set of search results identifies more than a threshold number of items;
   prompting the user for additional request criteria through the messaging protocol in response to the determining that the set of search results identifies more than a threshold number of items;
   receiving a reply that comprises the additional request criteria from the user via the messaging protocol;
   converting the reply to a second request criteria;
   filtering the set of search results based on the second request criteria; and
   presenting the filtered set of search results to the user within a message presented to the user within the messaging protocol.

2. The method of claim 1, wherein the search query is a machine readable search query.

3. The method of claim 1, wherein the presenting of the filtered set of search results includes causing display of a set of links to one or more item listings.

4. The method of claim 1, wherein the threshold number of items is one item.

5. The method of claim 1, further comprising associating the informal language request with a messaging identifier, and wherein the method further comprises:
   detecting a notification event; and
   retrieving a message associated with the messaging identifier in response to the notification event wherein the response to the request includes the message.

6. The method of claim 1, wherein the messaging protocol is at least one of an instant messaging (IM) protocol, a short messaging service (SMS) messaging protocol, a multimedia messaging service (MMS) protocol, and a web browser-based messaging protocol.

7. A system comprising:
   processors; and
   a memory storing instructions that, when executed by at least one processor among the processors, causes the system to perform operations comprising:
   receiving a natural language request from a user via a messaging protocol, the natural language request comprising a first request criteria;
   translating the natural language request to a search query based on the first request criteria;
   retrieving a set of search results based on the search query;
   determining that the set of search results identifies more than a threshold number of items;
   prompting the user for additional request criteria through the messaging protocol in response to the determining that the set of search results identifies more than a threshold number of items;
   receiving a reply that comprises the additional request criteria from the user via the messaging protocol;
   converting the reply to a second request criteria;

filtering the set of search results based on the second request criteria; and presenting the filtered set of search results to the user within a message presented to the user within the messaging protocol.

8. The system of claim 7, wherein the search query is a machine readable search query.

9. The system of claim 7, wherein the threshold number of items is one of the filtered set of search results includes causing display of a set of links to one or more item listings.

10. The system of claim 7, wherein the threshold number of items is one item.

11. The system of claim 7, further comprising associating the informal language request with a messaging identifier, and wherein the method further comprises:

detecting a notification event; and retrieving a message associated with the messaging identifier in response to the notification event wherein the response to the request includes the message.

12. The system of claim 7, wherein the messaging protocol is at least one of an instant messaging (IM) protocol, a short messaging service (SMS) messaging protocol, a multimedia messaging service (MMS) protocol, and a web browser-based messaging protocol.

13. A non-transitory machine-readable storage medium comprising instructions that, when executed by one or more processors of a machine, cause the machine to perform operations comprising:

receiving a natural language request from a user via a messaging protocol, the natural language request comprising a first request criteria;

translating the natural language request to a search query based on the first request criteria;

retrieving a set of search results based on the search query;

determining that the set of search results identifies more than a threshold number of items;

prompting the user for additional request criteria through the messaging protocol in response to the determining that the set of search results identifies more than a threshold number of items;

receiving a reply that comprises the additional request criteria from the user via the messaging protocol;

converting the reply to a second request criteria;

filtering the set of search results based on the second request criteria; and presenting the filtered set of search results to the user within a message presented to the user within the messaging protocol.

14. The non-transitory machine-readable storage medium of claim 13, wherein the search query is a machine readable search query.

15. The non-transitory machine-readable storage medium of claim 13, wherein the presentation of the filtered set of search results includes a set of links to one or more item listings.

16. The non-transitory machine-readable storage medium of claim 13, wherein the threshold number of items is one item.

17. The non-transitory machine-readable storage medium of claim 13, wherein the messaging protocol is at least one of an instant messaging (IM) protocol, a short messaging service (SMS) messaging protocol, a multimedia messaging service (MMS) protocol, and a web browser-based messaging protocol.

* * * * *

UNITED STATES PATENT AND TRADEMARK OFFICE
CERTIFICATE OF CORRECTION

PATENT NO. : 10,121,175 B2
APPLICATION NO. : 15/690508
DATED : November 6, 2018
INVENTOR(S) : Xiaoming Zhang It is certified that error appears in the above-identified patent and that said Letters Patent is hereby corrected as shown below:

In the Specification

In Column 1, Line 16, delete "international" and insert -- International --, therefor.

In the Claims

In Column 11, Lines 8-9, in Claim 9, delete "threshold number of items is one of" and insert -- presenting of --, therefor.

Signed and Sealed this
Twelfth Day of February, 2019

Andrei Iancu
*Director of the United States Patent and Trademark Office*